(12) United States Patent　　(10) Patent No.: US 8,437,258 B2
Agiwal et al.　　(45) Date of Patent: May 7, 2013

(54) METHOD AND SYSTEM FOR TRANSMITTING AND RECEIVING MANAGEMENT MESSAGE IN COMMUNICATION NETWORK

(75) Inventors: Anil Agiwal, Bangalore (IN); Young-Bin Chang, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 357 days.

(21) Appl. No.: 12/803,755

(22) Filed: Jul. 6, 2010

(65) Prior Publication Data

US 2011/0004800 A1　Jan. 6, 2011

(30) Foreign Application Priority Data

Jul. 6, 2009　(IN) ............................ 1600/CHE/2009

(51) Int. Cl.
*H04L 1/00*　(2006.01)
*H04L 1/14*　(2006.01)
*G06F 15/173*　(2006.01)

(52) U.S. Cl.
USPC ............................ 370/235; 709/224; 714/750

(58) Field of Classification Search ........................ None
See application file for complete search history.

(56) References Cited

U.S. PATENT DOCUMENTS

2006/0171417 A1 * 8/2006 Ihm et al. ...................... 370/474

* cited by examiner

*Primary Examiner* — Clemence Han (57) ABSTRACT

A method for transmitting management message by a transmitting device in a communication network includes receiving a management message that is to be transmitted in the communication network. The transmitting device determines whether a feedback is required for the management message when the management message is transmitted in the communication network. The transmitting device also includes a feedback request information in a Medium Access Control (MAC) Protocol Data Unit (PDU) including a last fragment of the management message. The management message can be transmitted in one or more MAC PDUs and can be divided into one or more fragments. The transmitting device also transmits the MAC PDU indicating the feedback request information.

42 Claims, 10 Drawing Sheets

METHOD AND SYSTEM FOR TRANSMITTING AND RECEIVING MANAGEMENT MESSAGE IN COMMUNICATION NETWORK

CROSS-REFERENCE TO RELATED APPLICATION(S) AND CLAIM OF PRIORITY

The present application claims the benefit under 35 U.S.C. §119(a) of an Indian provisional patent application filed in the Indian Intellectual Property Office on Jul. 6, 2009 and assigned Serial No. 1600/CHE/2009 and an Indian patent application filed in the Indian Intellectual Property Office on Jun. 15, 2010 and assigned Serial No. 1600/CHE/2009, the entire disclosures of which are hereby incorporated by reference.

TECHNICAL FIELD OF THE INVENTION

The present invention, in general, relates to a field of wireless communication technology. More specifically, the present invention relates to a field of reliable transmission of management messages in mobile broadband wireless access (MBWA) system.

BACKGROUND OF THE INVENTION

Broadband wireless networks, based on various standards, for example Institute for Electrical and Electronic Engineers (IEEE) 802.16e based Worldwide Interoperability for Microwave Access (WiMAX) standard and its evolution to IEEE 802.16m, provide various types of services, such as voice, packet data exchange, and the like. In order to provide such services, control information needs to be exchanged between a mobile station (MS) and a base station (BS). The control information is generated by various protocols running at the MS and the BS. Typically, wireless communication standards beyond $3^{rd}$ Generation (3G), for example $3^{rd}$ Generation Partnership Projects (3GPP), Long Term Evolution (LTE), IEEE 802.20, and IEEE 802.16e-2005 (mobile WiMAX) use management messages to exchange the control information.

A wireless communication network environment includes one or more base stations (BSs) and one or more mobile stations (MSs) that communicate with one or more BSs through one or more wireless communication network standards. The one or more wireless communicator networks may use different types of communication technologies. For example, the wireless communicator network includes networks that comply with the Mobile WiMAX (based on IEEE 802.16e or IEEE 802.16m), 3GPP LTE, 3GPP2 AIE, IEEE 802.20 or other wireless network standards. Hence, for appropriate operational behavior in certain scenarios it is important that the management messages should be delivered reliably by the MS to BS and vice versa.

In one communication network standard, for example the IEEE 802.16 based WiMAX standard and its evolution, the method support reliable delivery of management message in a following manner. Initially, each management message is associated with a message timer. The message timer is different for different management messages because each management message includes different urgency and processing delay requirements. Further, the message timer is started as soon as the management message is given to signaling protocol, which is responsible for reliable transmission of the management message. Further, if the message timer expires, then the signaling protocol discards the management message and informs the protocol that has given the discarded management message for transmission. Thereby, the initiator protocol may reinitiate the transmission of management message.

In the above method, the management messages also can be fragmented if the management message is large. Further, the management message is said to be successfully transmitted when all the fragments of the management message are successfully received by a receiving device. The signaling protocol re-transmits the management message fragment or the entire message, respectively, if it determines that management message fragment or entire management message is lost before the message timer expires. The determination of loss is done based on the receiving device feedback.

However in the above method, the transmitting device transmits the management message or management message fragment using Hybrid Automatic Repeat Request (HARQ) at Physical (PHY) layer. The transmitting device considers local Negative-Acknowledge (NACK) after maximum HARQ retries (MAX HARQ RETRIES) are over for the HARQ packet including the management message or the management message fragment. However, in the method, the HARQ NACK to ACK error quick retransmission of the lost management message fragment is not possible. Hence, the entire message needs to be retransmitted after the response message timer expires. This adds to significant delay in recovery as the transmitting device keeps waiting for the response message or response message timer to expire after receiving HARQ ACK for all HARQ packets including management message fragments.

Hence, there exists a need to efficiently manage management transmission messages in the communication network.

SUMMARY OF THE INVENTION

To address the above-discussed deficiencies of the prior art, it is a primary object to provide at least the advantages described below. Accordingly, an aspect of the present invention is to provide a system and method for transmitting and receiving management message in a communication network.

In accordance with an aspect of the present invention, a method for transmitting management message by a transmitting device in a communication network is provided. The method includes receiving the management message that is to be sent in the communication network; determining whether a feedback is required for the management message, wherein the feedback is required when the management message is transmitted in the communication network; including a feedback request information in a Medium Access Control (MAC) Protocol Data Unit (PDU) including a last fragment of the management message, wherein the management message is transmitted in one or more MAC PDUs, wherein the management message is divided into one or more fragments; and transmitting the MAC PDU indicating the feedback request information.

In accordance with another aspect of the present invention, a method for receiving management message by a receiving device in a communication network is provided. The method includes receiving one or more MAC PDUs including management message fragments transmitted in the communication network; wherein the management message is divided into one or more fragments; determining whether a feedback is required for the management message; and if the feedback is required, transmitting the feedback for a received management message, wherein the management message requires the feedback.

In accordance with yet another aspect of the present invention, a communication device is provided. The communication device includes a transceiver that can: receive a management message that is to be transmitted in a communication network; transmit a MAC PDU including a feedback request information; receive one or more MAC PDUs including management message fragments transmitted in the communication network; and transmit a feedback for the management message fragments included in received MAC PDUs, wherein the management message requires the feedback. The communication device also includes a processor that can: determine whether the feedback is required for the management message; and include the feedback request information in a MAC PDU including a last fragment of the management message.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
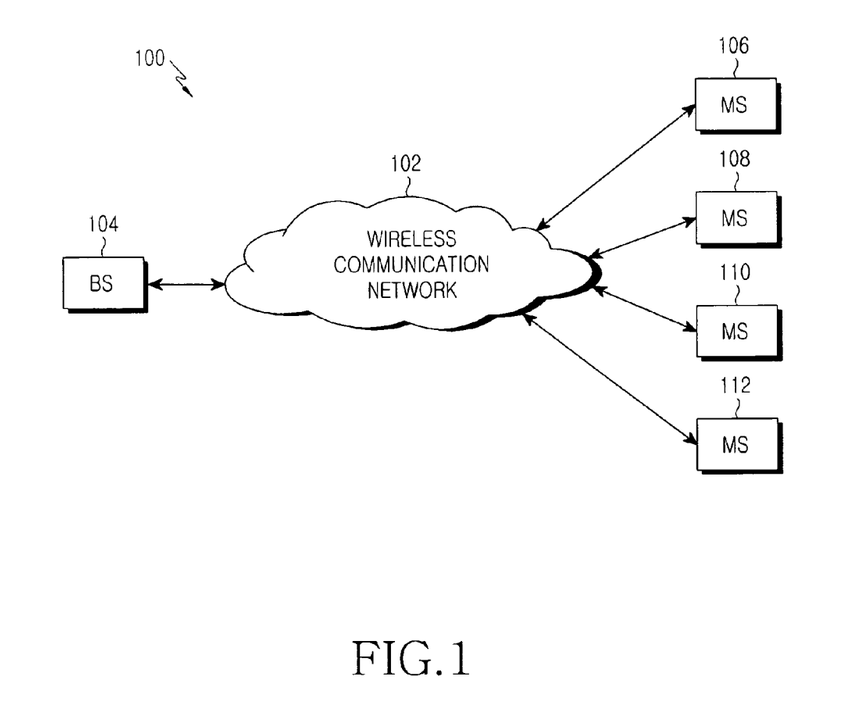
FIG. 1 illustrates an environment in accordance with an exemplary embodiment of the present invention.

FIG. 1 illustrates an environment 100 where various embodiments of the invention is practiced in accordance with the present invention.

Referring to FIG. 1, the environment 100 includes a wireless communication network 102. In one example, the wireless communication network 102 is a Mobile Broadband Wireless Access (MBWA) system standard. In an another example, the wireless communication network 102 may be any type of wireless network, including networks that comply with Mobile WiMAX (based on IEEE 802.16e or IEEE 802.16m), 3GPP LTE, 3GPP2 Air Interface Evolution (AIE), IEEE 802.20 or other wireless network standards.

The environment 100 also includes a base station (BS) 104 and one or more mobile stations (MSs), for example, MS 106, MS 108, MS 110 and MS 112. The MSs 106 to 112 communicate with BS 104 through the wireless communication network 102. In certain examples, for operational behavior it is important that some management messages are reliably transmitted by the MS to BS and vice versa. The management messages are different types and thus transmission of management messages should be reliable. For reliable transmission, each management message is associated with a message timer. The message timer is different for different management messages as each management message has different urgency and processing delay requirements. The message timer is started as soon as the management message is given to signaling protocol which is responsible for reliable transmission of management message.

Further, if the message timer expires, signaling protocol discards the management message and informs the protocol that has given the discarded management message to it for transmission. The initiator protocol may reinitiate the transmission of management message. The management messages can be fragmented if the management message is too large. The management message is said to be successfully transmitted when all the fragments of the management message are successfully received by a receiving device. Also, the signaling protocol re-transmits the management message fragment or the entire management message if it determines that management message fragment or entire management message is lost, respectively, before the message timer expires. The determination of loss is done based on feedback of the receiving device.

Basically, the management message can be four types based on a timer value and type of request response feedback. For example, a management message of first type (Type 1) is a message that needs a response (RSP) after transmitting the request (REQ) and is required a large response timer. After the transmission of the management message of the first type, a transmitting device waits for a response message from a receiving device. Further, if the time to wait for the response message is greater than a RESPONSE_TIMER_THRESHOLD, the response message is REQ-RSP with a large response timer value. For the purpose of this disclosure, such types of message is referred as 'Type 1' message.

A management message of second type (Type 2) is REQ-RSP with small response timer. The transmitting device requests a response to the receiving device, after transmitting the management message of the second type. In the transmitting device, the time to wait for response message is smaller than a RESPONSE_TIMER_THRESHOLD. For the purpose of this disclosure, such types of message is referred as 'Type 2' message.

A management message of third type (Type 3) is of a type that is a one way message and needs reliable transmission. The transmitting device, after transmitting the management message of the third type, does not wait for a response message from the receiving device, but a reliable transmission of message should be done. Reliable transmission means that the transmitting device has to ensure that message is delivered to the receiving device successfully. For the purpose of this disclosure, such types of message is referred as 'Type 3' message.

A management message of fourth type (Type 4) is one which is a one way message and makes a best effort transmission. The transmitting device, after transmitting a management message of the fourth type, does not wait for a response message from the receiving device, and the best effort transmission of message is made. Best effort transmission means that the transmitting device transmits the message and it does not have to ensure that message is delivered to the receiving device successfully always. After the transmission the message may or may not reach the receiving device. For the purpose of this disclosure, such types of message is referred as 'Type 4' message.

Thus, in the environment 100, if the MSs 106 to 112 transmit the Type 1 and Type 3 messages, then the MSs 106 to 112 will request the wireless communication network 102 to transmit a response for the Type 1 and Type 3 messages. However, if the MSs 106 to 112 transmit the Type 2 and Type 4 messages, then the response is not requested. For the sake of clarity and for the purpose of this disclosure, the type of the management message is summarized again. The Type 1 message is a message that is REQ-RSP with large response timer. The Type 2 message is a message that is REQ-RSP with small response timer. The Type 3 message is a one way message with reliable transmission. The Type 4 message is a one way message with a best effort transmission.

The number given to the type of the messages is for the purpose of explanation and for the sake of clarity and thus does not limit the invention to the same type of messages and numbers. Hence, a personal having ordinary skills in the art can implement this invention with other messages and can also use different numbers for different types of message.

Figure 2:
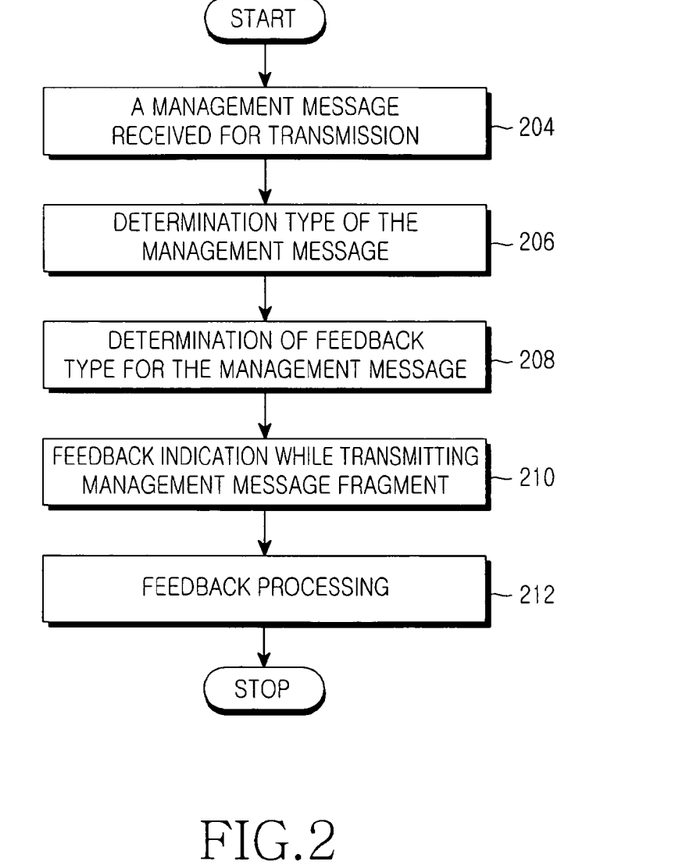
FIG. 2 illustrates a method to transmit a management message by a transmission device in accordance with an exemplary embodiment of the present invention.

FIG. 2 illustrates a method to transmit a management message by a transmission device in accordance with an exemplary embodiment of the present invention.

Referring to FIG. 2, at block 204, a management message is received for transmission. In an embodiment, the management message is received from a higher layer to a lower layer in the transmitting device for transmitting the management message to a receiving device. At block 206, the transmitting device determines the type of the management message. At block 208, the transmitting device determines feedback type for the management message. That is, the transmitting device determines, based on the type of the management message, whether a feedback is required from the receiving device or not. For example, the transmitting device identifies that whether the management message is one of a Type 1 message, Type 2 message, Type 3 message and Type 4 message. The types of management messages are explained above in conjunction with the FIG. 1.

In an embodiment, the management message is divided in to one or more fragments. At block 210, the transmitting device determines, while transmitting each fragment of the management message, that whether a feedback indication needs to be transmit or not, and transmits feedback indication according to a result of the determination. At block 212, the transmitting device performs feedback processing as received from the wireless communication network.

Figure 3:
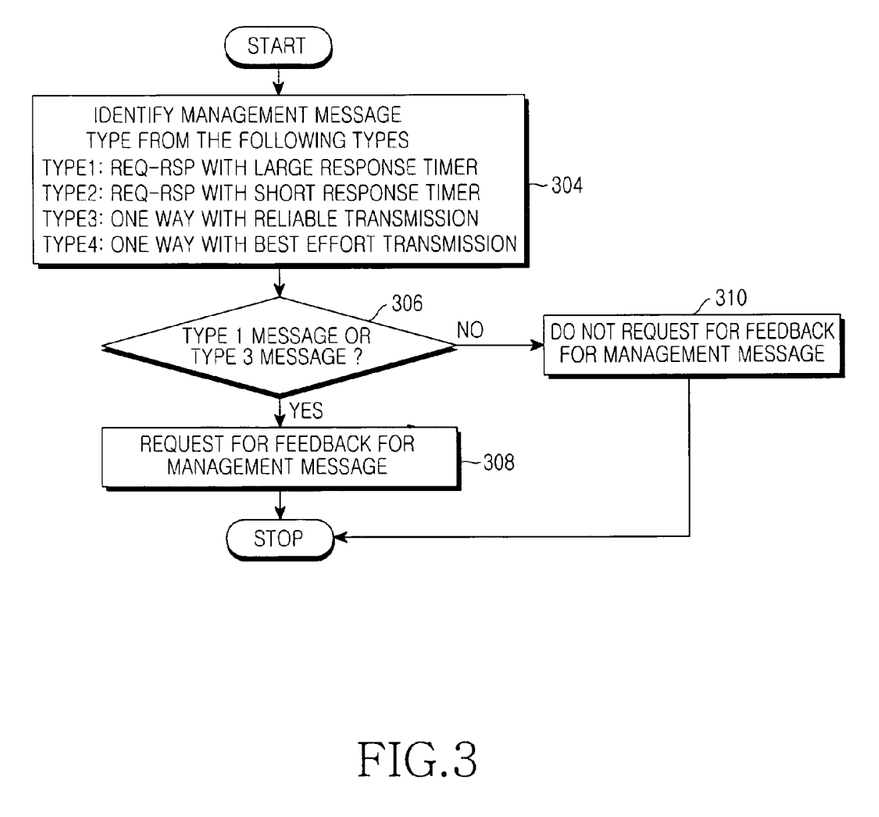
FIG. 3 illustrates a method for feedback determination of a transmitting device in accordance with an exemplary embodiment of the present invention.

FIG. 3 illustrates a method for feedback determination of a transmitting device, in accordance with an exemplary embodiment of the present invention.

Referring to FIG. 3, at block 304, a transmitting device identifies the type of management message. At block 306, the transmitting device identifies whether the management message is a Type 1 message or Type 3 message. Further, if the management message is a Type 1 message or Type 3 message, then the transmitting device identifies that the feedback is requested from a receiving device to determine status of a transmitted management message fragment. In an embodiment, the feedback may be an Acknowledgment (ACK) transmitted by the receiving device, which receives all fragments of the management message.

For Type 1 message, the feedback is in addition to the response message. For Type 3 message, the transmitting device only waits for response message after transmitting the entire management message and, thus, no additional feedback is requested. At block 306, if the method determines that the management message is a Type 1 message or Type 3 message, then at block 308, the transmitting device request the feedback for the management message to the receiving device. However, if the management message is Type 2 message or Type 4 message, then transmitting device proceeds to block 310. At block 310, the transmitting device do not request feedback for the management message to the receiving device.

Figure 4:
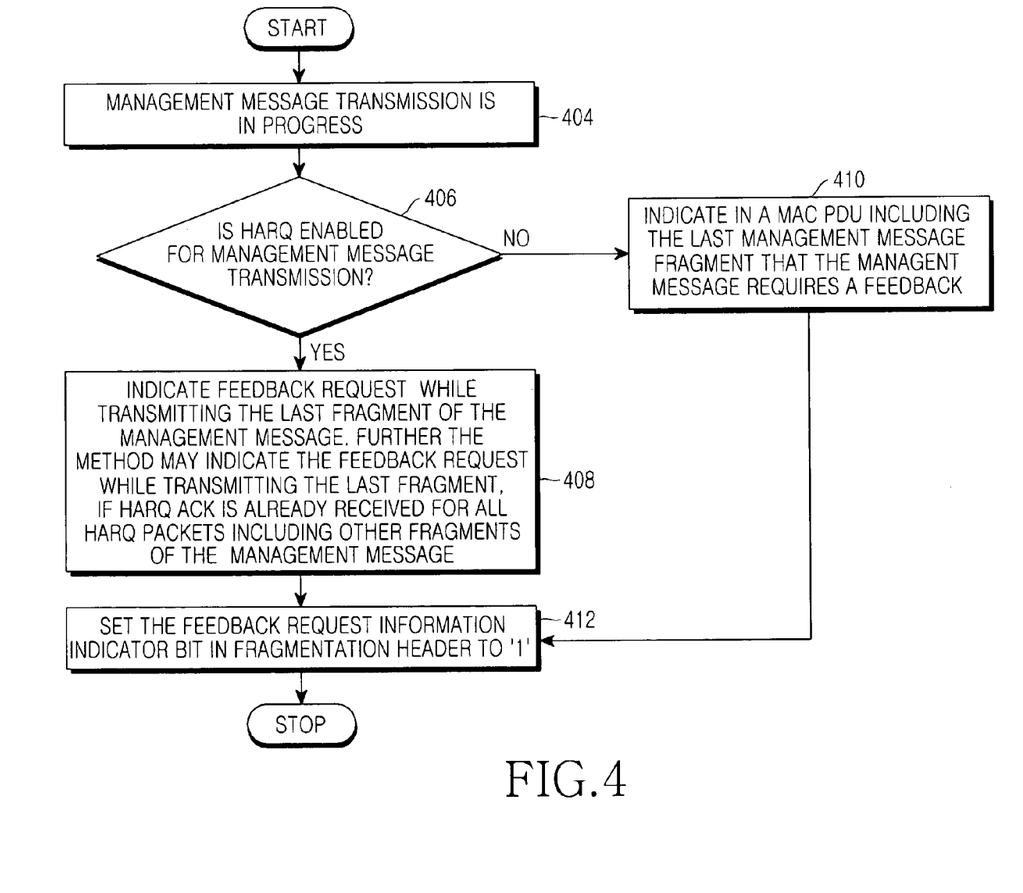
FIG. 4 illustrates a method for feedback-indication of a transmitting device in accordance with an exemplary embodiment of the present invention.

FIG. 4 illustrates a method for feedback-indication of a transmitting device, in accordance with an exemplary embodiment of the present invention. This method is invoked for a Type 1 message and a Type 3 message.

Referring to FIG. 4, at block 404, a transmitting device transmits a management message. At block 406, the transmitting device determines whether Hybrid Automatic Repeat Request (HARQ) is enabled for management message transmission. If the transmitting device determines that the HARQ is enabled for management message transmission, then block 408 is performed. At block 408, the transmitting device indicates feedback request while transmitting the last management message fragment. In an exemplary embodiment, the transmitting device may indicate the feedback request information while transmitting the last management message fragment if only one management message fragment is transmitted using HARQ at a time and, if HARQ ACK is already received for all HARQ packets including other fragments of the management message.

In one embodiment, one bit in the header including the fragmentation information for the management message in the MAC PDU is used to include the feedback request information for indicating the feedback request. In an embodiment, the feedback request information is included in one bit in any header in the MAC PDU including the management message fragment.

In another embodiment, if the feedback needs to be transmitted by the receiving device within a fixed time, then the header in the MAC PDU including the management message may also include additional information along with the feedback request. The additional information is related to the time interval within which the receiving device has to transmit the feedback after receiving the feedback request.

At block 406, if the transmitting device determines that the HARQ is not enabled for management message transmission, then the transmitting device proceeds to block 410. At block 410, the transmitting device indicates feedback request while transmitting the last fragment of the management message. At block 412, the transmitting device sets the feedback request information indicator bit in fragmentation header to '1'.

Figure 5:
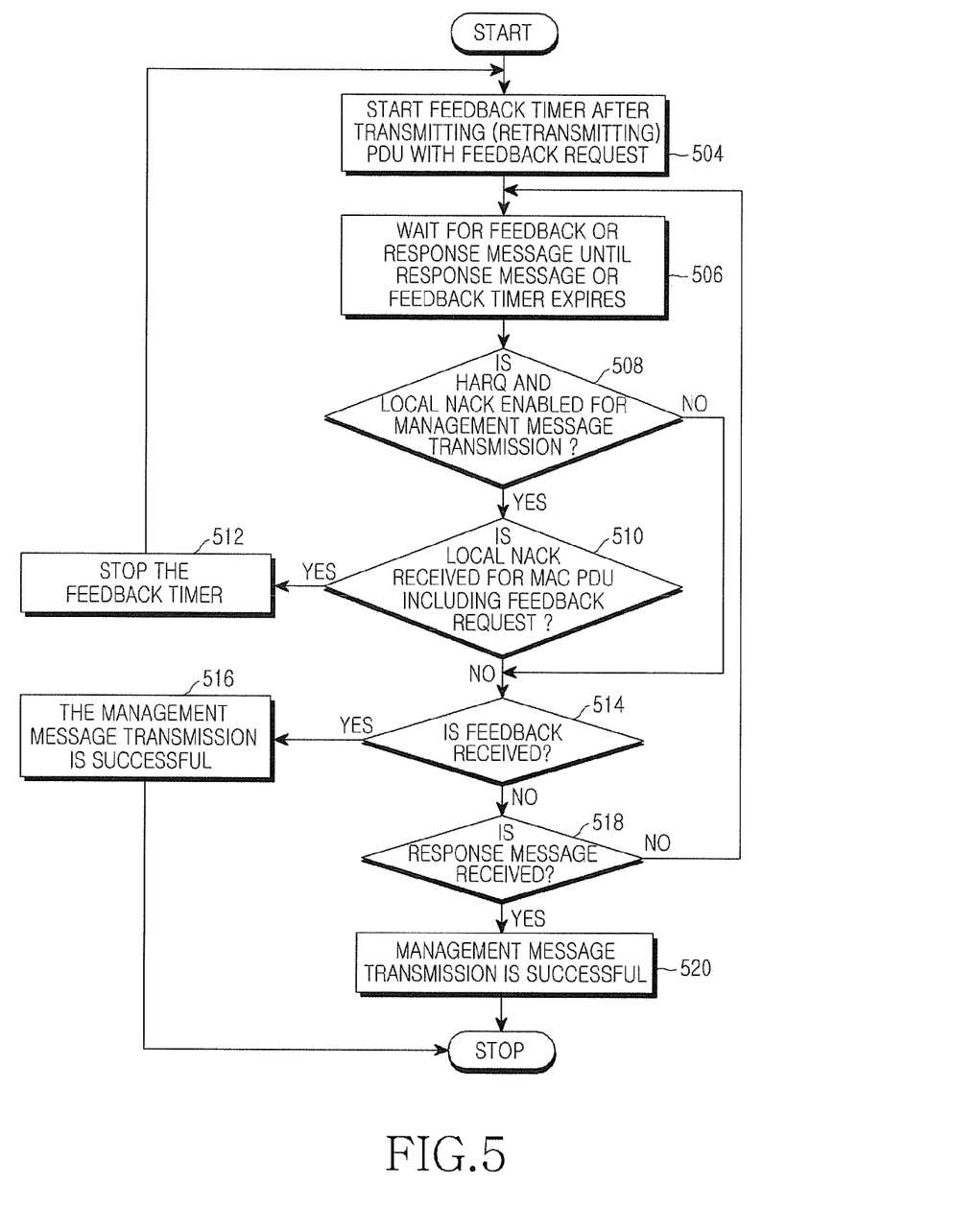
FIG. 5 illustrates a method for processing post feedback-indication of a transmitting device for a type 1 message in accordance with an exemplary embodiment of the present invention.

FIG. 5 illustrates a method for processing post feedback-indication of a transmitting device for a type 1 message in accordance with an exemplary embodiment of the present invention.

Referring to FIG. 5, at block 504, the transmitting device starts Feedback timer after transmitting (retransmitting) MAC PDU with feedback request. At block 506, the transmitting device waits for feedback for a fixed period of time immediately after transmitting the feedback request in a MAC PDU including the last fragment of the management message.

At block 508, the transmitting device checks whether the HARQ and local NACK are enabled for the management message transmission or not. If the HARQ and local NACK are enabled for the management message transmission, the transmitting device performs block 510. At block 510, the transmitting device identifies whether the local NACK is received for the MAC PDU including the feedback request. If the local NACK is received for the MAC PDU including the feedback request then the transmitting device performs block 512, otherwise the transmitting device performs block 514.

At block 512, if the local NACK is received for the MAC PDU including the feedback request, then the transmitting device stops the feedback timer to stop waiting for the feedback. Thereafter, the transmitting device again performs block 504. Hence, the transmitting device restarts waiting for feedback for a fixed time immediately after retransmitting the feedback request in a MAC PDU including the last fragment of the management message.

At block 514, the transmitting device checks whether the feedback is received or not. If the feedback is received, the transmitting device performs block 516, else the transmitting device performs block 518. At block 516, the transmitting device declares the management message transmission as successful. At block 518, the transmitting device checks whether the response message is received or not. If the response message is received while waiting for the feedback, then the transmitting device treats the response message as an implicit feedback and thereafter performs block 520. At block 520 the transmitting device declares the management message transmission as successful. However, if the receiving device does not receive the feedback within the fixed time or response message timer expires, the management message transmission is declared as failed and block 506 is again performed.

Figure 6:
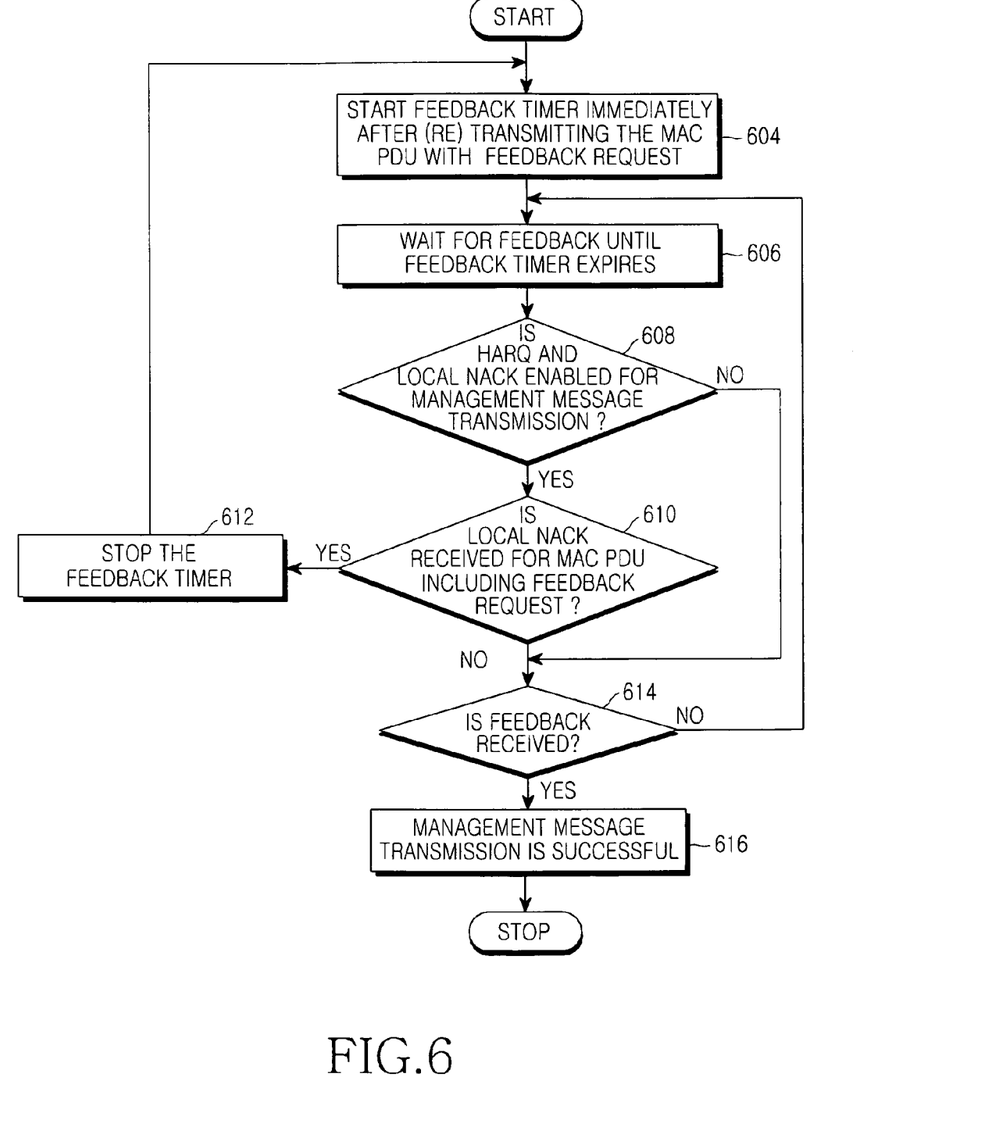
FIG. 6 illustrates a method for processing post feedback-indication of the transmitting device for a type 3 message in accordance with an exemplary embodiment of the present invention.

FIG. 6 illustrates a method for processing post feedback-indication of the transmitting device for a type 3 message in accordance with an exemplary embodiment of the present invention.

Referring to FIG. 6, in an embodiment, feedback is transmitted by a receiving device when all fragments of a management message are received. At block 604, the transmitting device starts the Feedback timer immediately after transmitting (retransmitting) the MAC PDU with feedback request. At block 606, the transmitting device waits for feedback until Feedback timer expires. Hence the transmitting device waits for feedback for a fixed period of time immediately after transmitting the feedback request in a MAC PDU including the last fragment of the management message.

At block 608, the transmitting device checks whether the HARQ or local NACK is enabled for the management message transmission. Further, if the HARQ and local NACK is enabled then the transmitting device performs block 610, otherwise the transmitting device performs block 614. At block 610, if the local NACK is received for the MAC PDU including feedback request then the transmitting device stops the Feedback timer at block 612 and again performs block 604.

At block 614, the transmitting device checks whether the feedback is received or not. Hence, in an embodiment, if the HARQ and local NACK are enabled for management message transmission and local NACK is received for the MAC PDU including the feedback request, then the transmitting device stops waiting for the feedback. Thereafter, in block 606, the transmitting device restarts waiting for feedback for a fixed time immediately after retransmitting the feedback request in the MAC PDU including the last fragment of the management message. If the receiving device does not receive the feedback within the fixed time, the management message transmission is declared failed. At block 616, the transmitting device is declared successful if the feedback is received at block 614.

Figure 7A:
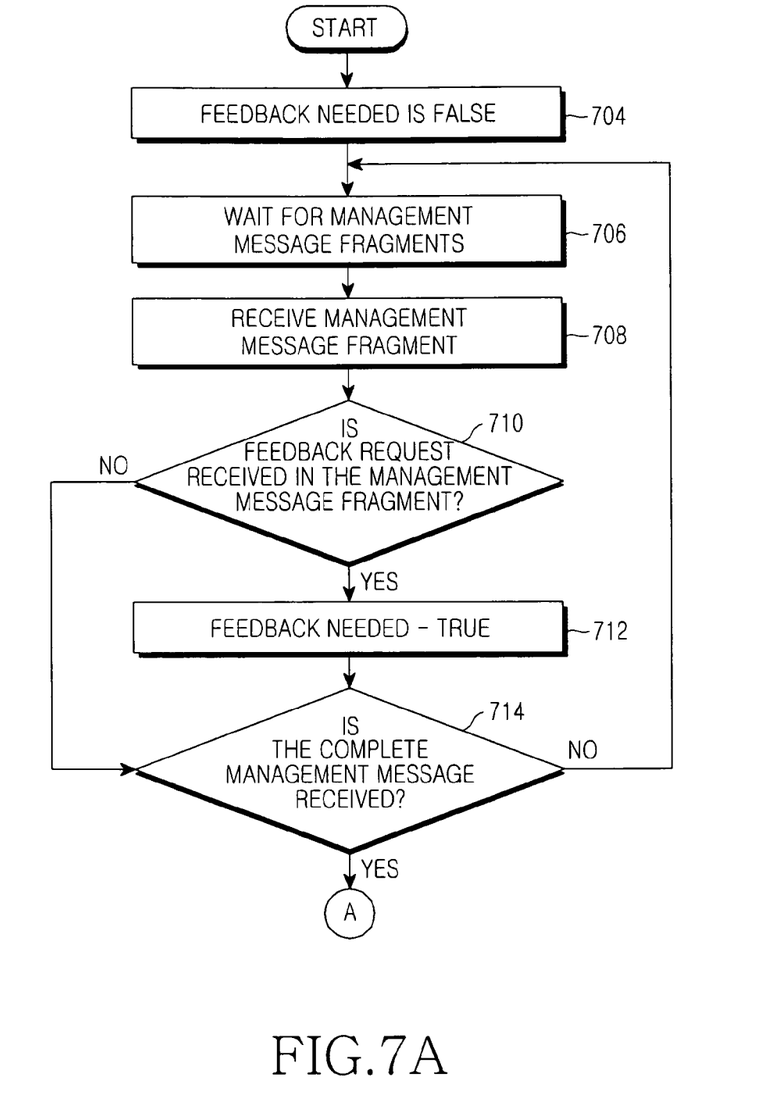
FIGS. 7A and 7B illustrate a method for operation of a receiving device in accordance with an exemplary embodiment of the present invention.
Figure 7B:
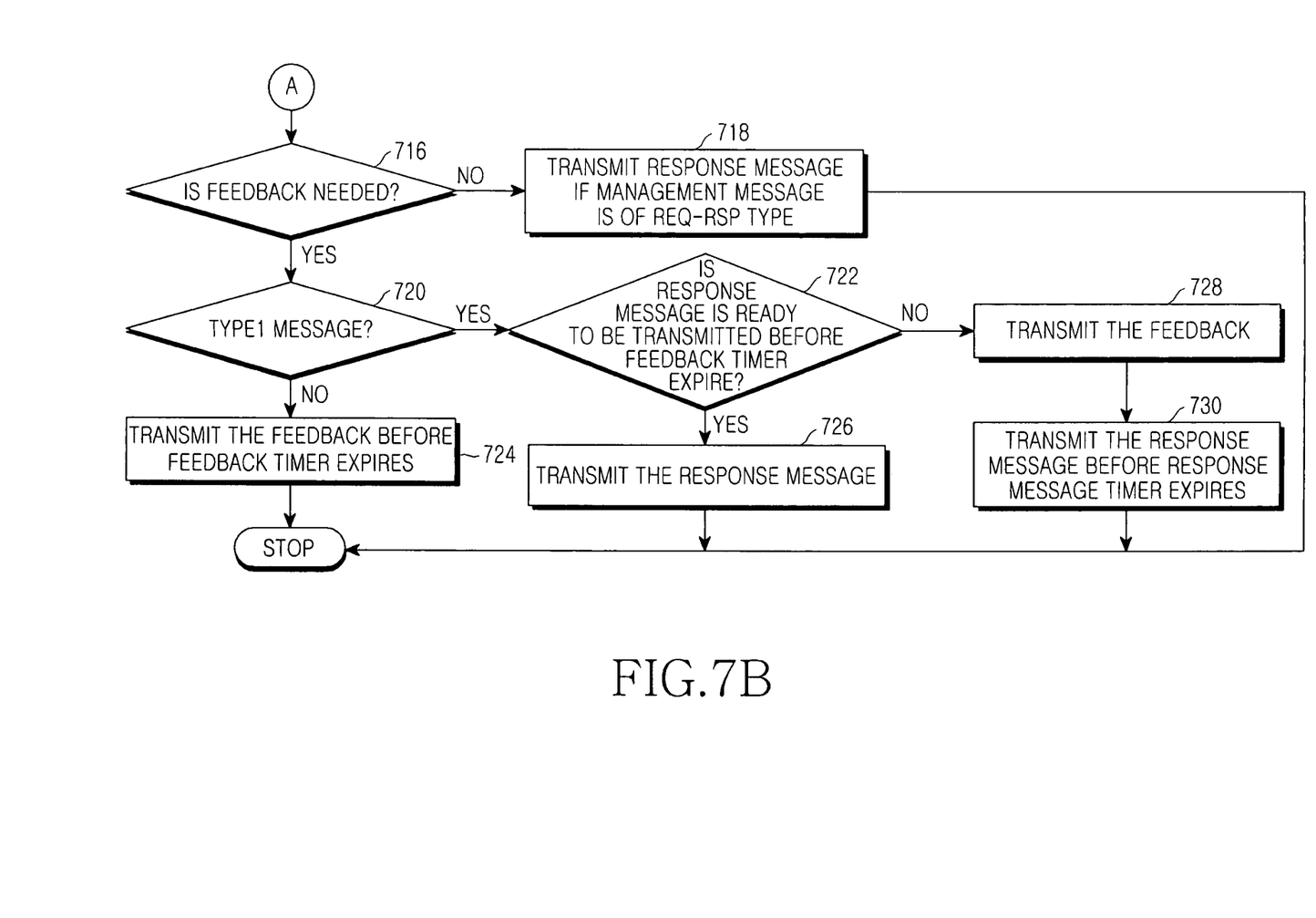

FIGS. 7A and 7B illustrate a method performed by a receiving device in accordance with an exemplary embodiment of the present invention.

Referring to FIG. 7A, at block 704 the receiving device sets the feedback to false before receiving any fragment of a management message. At block 706, the receiving device waits for the management message fragments. At block 708, the receiving device receives the management message fragment. At block 710, the receiving device checks whether the feedback request is received in the management message fragment or not based on the feedback request information indicator bit in a header in the MAC PDU. At block 714, if the feedback request is not received then the receiving device checks whether the complete management message has been received or not.

If at block 710, the receiving device identifies that the feedback request is received, then the receiving device at block 712 sets feedback needed as true in the receiving device and performs block 714. At block 714, if it is determined that the management message is not received completely, then the receiving device performs block 706 again and waits for other management message fragments. If at block 714, it is determined that the management message is received completely, then the receiving device performs block 716 of FIG. 7B.

Meanwhile, the encircled 'A' of FIGS. 7A and 7B is used for connecting block 714 of FIG. 7A and block 716 of FIG. 7B. Referring to FIG. 7B, at block 716, the receiving device checks whether the feedback is needed or not. If the feedback is not needed then at block 718, the receiving device transmits the response message if type of management message is of REQ-RSP type. If at block 716, the receiving device identifies that the feedback is needed, then at block 720 the receiving device checks whether the management message is a Type 1 message. If the management message is not a Type 1 message, then at block 724 the receiving device transmits feedback before the feedback timer expires.

At block 720, if it is identifies that the management message is Type 1 message, then at block 722 the receiving device checks whether the response message is ready to be transmitted before the feedback timer expires. If the response message is ready to be transmitted before the feedback timer expires then at block 726 the receiving device transmits the response message. At block 722, if the receiving device identifies that the response message is not ready to be transmitted before the feedback timer expires, then at block 728, the receiving device transmits the feedback and, thereafter, at block 730, the receiving device transmits the response message before the response message timer expires. In an alternate embodiment, at block 720, if it is identified that the management message is a Type 1 message, the receiving device performs block 728 wherein the feedback is transmitted and, thereafter, at block 730, the response message is transmitted before the response message timer expires.

In the embodiment, if one of the management message fragments indicates feedback request then the receiving device after receiving all fragments of the management message performs one of the following. For a Type 1 message, the receiving device can transmit feedback within the time period for which transmitting device is waiting for feedback, followed by response message before the expiry of response message timer. The receiving device can also transmit a response message within the time period for which transmitting device is waiting for feedback. Further, for a Type 3 message, the receiving device can transmit feedback within time for which the transmitting device is waiting for feedback. In an embodiment, the feedback transmitted for the received management message includes a sequence number of the management message fragment received in the MAC PDU in which feedback request information indicator is set to '1'.

Figure 8:
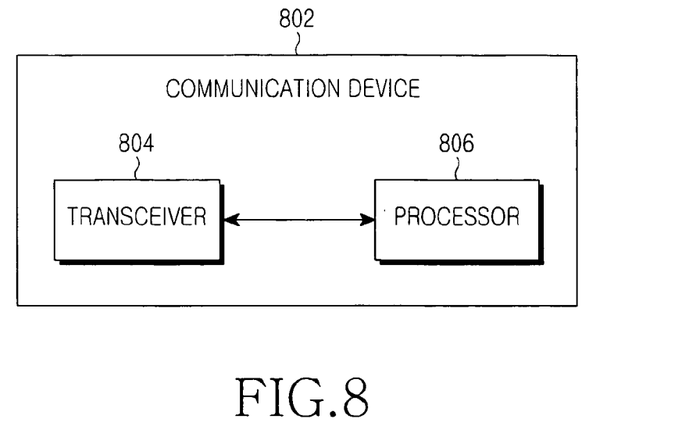
FIG. 8 illustrates a communication device in accordance with an exemplary embodiment of the present invention.

FIG. 8 illustrates a communication device, in accordance with an exemplary embodiment of the present invention. The communication device can be a transmitting device or a receiving device. The communication device performs operations of the transmitting device or the receiving device.

Referring to FIG. 8, the communication device 802 includes a transceiver 804 and a processor 806. The transceiver 804 is capable of receiving management messages that are to be transmitted in a wireless communication network. Further, the transceiver 804 transmits feedback request information in the MAC PDU based on a type of the management message. The transceiver 804 is also capable of receiving one or more MAC PDUs including management message fragments transmitted in the wireless communication network. Thereafter, the transceiver 804 transmits the feedback for the received management message when the management message requires feedback.

The processor 806 is capable of determining whether a feedback is required for the management message or not. Further, the processor 806 indicates feedback request information in a MAC PDU including a last fragment of the management message.

Figure 9:
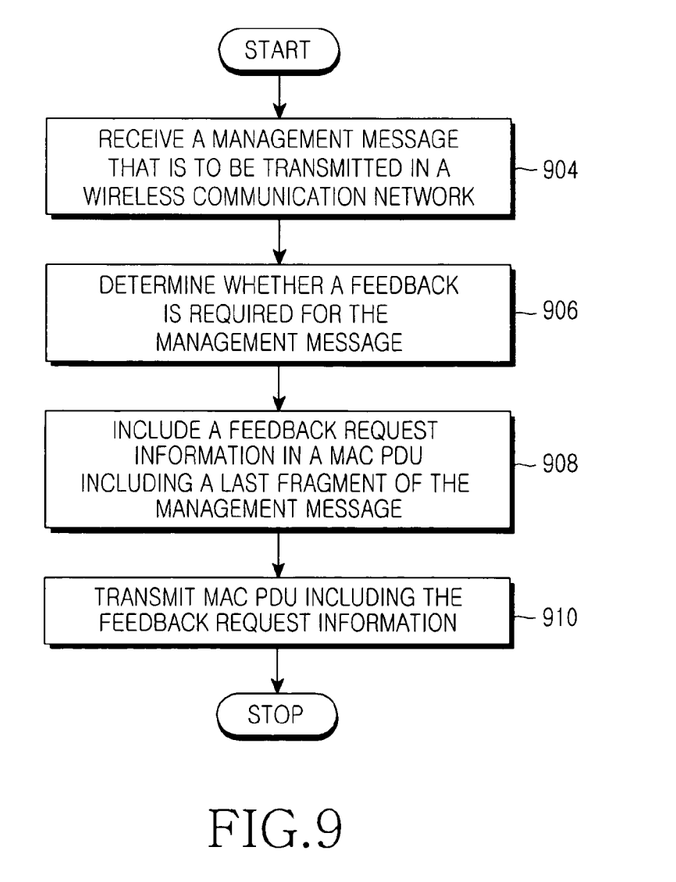
FIG. 9 illustrates a method for transmitting a management message by a transmitting device in a wireless communication network in accordance with an exemplary embodiment of the present invention.

FIG. 9 illustrates a method for transmitting management message by a transmitting device in a wireless communication network in accordance with an exemplary embodiment of the present invention.

Referring to FIG. 9, at block 904, the transmitting device receives a management message that is to be transmitted in the wireless communication network. At block 906, the transmitting device determines whether a feedback is required for the management message or not. In an embodiment, the feedback is required from a receiving device when the management message is transmitted to a receiving device in the wireless communication network. In an embodiment, determining whether the feedback is required or not is identified based on the type of management message.

In an embodiment, when the management message is a message that requires a response to the request and includes a large response timer, then the feedback is required. In another embodiment, when the management message is of a type that is a unidirectional message and requires a reliable transmission then the feedback is required. In an embodiment, when the management message requires a response to the request and a response time associated with the management message is greater than a predefined threshold then the feedback is required. The predefined threshold is a RESPONSE_TIMER_THRESHOLD.

At block 908, the transmitting device includes feedback request information in a MAC PDU including the last fragment of the management message when the management message is transmitted in one or more MAC PDUs. Further, the transmitting device divides the management message into one or more fragments. In an embodiment, the feedback request information is indicated in the MAC PDU by indicating the feedback request information in the last fragment when the management message fragments are transmitted using HARQ with one message fragment in transmission at a time. In the embodiment, HARQ ACK is received for all HARQ packets including other fragments of the management message.

In an embodiment, the feedback is indicated as one bit of a header included in the MAC PDU. In the embodiment, the feedback request information is indicated in one bit of the header that is including fragmentation information of the management message. In an exemplary embodiment, the MAC PDU also includes additional information along with the feedback request information. For example, the additional information includes information associated with time interval within which a feedback is received after transmitting the feedback request. At block 910, the transmitting device transmits the MAC PDU including the feedback request information.

In an embodiment, after transmitting the MAC PDU including feedback request information a timer is started. Thereafter, the transmitting device waits for a fixed interval of time to receive a feedback after transmitting the MAC PDU that carried the last fragment of the management message and the feedback request information.

In an embodiment, if a HARQ and a local NACK is enabled for management message transmission then the transmitting device stops waiting for a fixed interval of time to receive a feedback, when a NACK is received for the MAC PDU including the feedback request information. Further, the feedback request information in the MAC PDU is retransmitted and the transmitting device again waits for a fixed interval of time to receive a feedback after MAC PDU including the last fragment of the management message and feedback request information is retransmitted.

In an embodiment, the transmitting device determines that transmission of the management message is successful when the feedback is received before the timer is expired. In this embodiment, the management message is a message that requires a response to the request and also includes a large response timer. Further the timer is expired when the waiting time to receive the feedback for a fixed interval is greater than the fixed interval of time. In an embodiment, the transmitting device determines that transmission of the management message is successful when the response message is received before the timer is expired.

In an embodiment, the transmitting device determines that transmission of the management message is failed when the feedback message is not received before the timer is expired. In the embodiment, the management message is a message that requires a response to the request and includes a large response timer further the timer is expired when the waiting time to receive the feedback for a fixed interval is greater than the fixed interval of time. In another embodiment, the transmitting device determines that transmission of the management message is failed when the feedback message or the response message is not received before the timer is expired. In this embodiment, the management message is a message that requires a response to the request and has a large response timer.

In another embodiment, the transmitting device determines that transmission of the management message is successful when the feedback is received before the timer is expired and when the management message is a unidirectional message and requires a reliable transmission. In another embodiment, when the feedback is not received before the timer is expired, the transmitting device determines that transmission of the management message is failed that is the unidirectional message which requires a reliable transmission.

Figure 10:
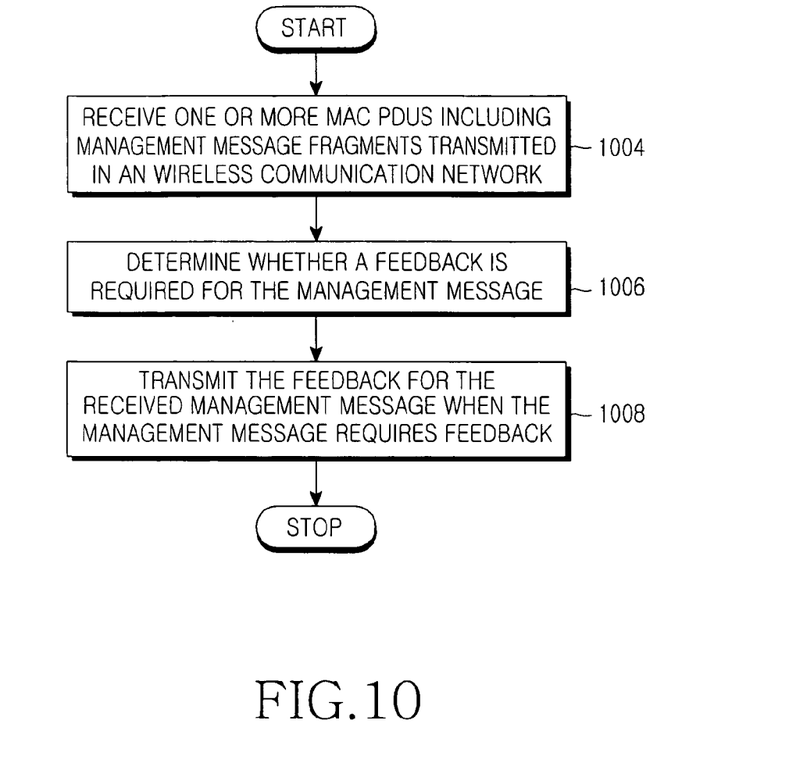
FIG. 10 illustrates a method for receiving a management message by a receiving device in a wireless communication network in accordance with an exemplary embodiment of the present invention.

FIG. 10 illustrates a method for receiving management message by a receiving device in an wireless communication network in accordance with an exemplary embodiment of the present invention.

Referring to FIG. 10, at block 1004 the receiving device receives one or more MAC PDUs including management message fragments transmitted in the wireless communication network. The management message is divided in to one or more fragments. At block 1006, the receiving device determines whether a feedback is required for the management message or not. At block 1008, the receiving device transmits the feedback for the management message if the management message requires feedback.

In an embodiment, the feedback is transmitted within a predefined time after receiving all the fragments of the management message. In an embodiment, the feedback request information indicator in MAC PDU including one of the fragments of the management message is decoded as '1'. In another embodiment, the feedback request information indicator is included in the header in the MAC PDU of the received management message fragment.

In an embodiment, the response message is transmitted within a predefined time after receiving all the fragments of the management message. The management message for which the feedback is transmitted is a message that requires a response to the request and the feedback request information indicator in MAC PDU including one of the fragments of the management message is decoded as '1'.

Further, the receiving device transmits the feedback within a defined time and transmits response message within a predefined response time after receiving all the fragments of the management message when the management message is a message that requires a response to the request and the feedback request information indicator in MAC PDU including one of the fragments of the management message is decoded as '1'.

In an embodiment, the receiving device transmits the response message within the response time after receiving all the fragments of the management message when the management message is a message that requires a response to the request and the feedback request information indicator in MAC PDU including one of the fragments of the management message is decoded as '0'. In an embodiment, the receiving device also transmits the feedback for the received management message that includes the sequence number of the management message fragment received in the MAC PDU in which feedback request information indicator is decoded as '1'.

Exemplary embodiments of the present invention provide a method and system for receiving and transmitting management messages in the communication network. The method reduces overhead of the communication network by informing the receiving device when a response and feedback is required and when it is not required. Thus, the method includes less ACK overhead. The method also avoids unnecessary retransmissions of management message or management message fragments.

Further, the method reduces delay in recovery from lost management message or management message fragments. Hence, the method includes determining the message types, determining the feedback based on the message type, feedback indication method and post feedback processing after the feedback indication thereby increasing efficiency of the communication network. Further, the resources of the communication network are also efficiently managed.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment, which is implemented using the computer system, various machine-readable mediums are involved, such as in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media is tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radiowave and infra-red data communications. Examples of machine-readable medium may include, but are not limited to, a carrier wave as or any other medium from which a computer can read, for example online software, download links, installation links, and online links.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting management message by a transmitting device in a communication network, the method comprising:
    determining whether a feedback is required for the management message that is divided into one or more fragments;
    if the feedback is required, including a feedback request information in a Medium Access Control (MAC) Protocol Data Unit (PDU) including a last fragment of the management message, wherein the one or more fragments of the management message is transmitted in at least one MAC PDU; and
    transmitting the MAC PDU including the feedback request information.

2. The method of claim 1, wherein determining whether the feedback is required comprises determining whether the feedback is required based on a type of the management message, wherein the type of the management message comprises at least one of:
    a first type that requires a response to the feedback request and requires using of a response timer set to a greater time than a threshold; and
    a second type of the management message that is a unidirectional message and requires a reliable transmission.

3. The method of claim 1, wherein determining whether the feedback is required comprises identifying whether the management message requires a response to a feedback request and wherein a response time associated with the management message is greater than a threshold.

4. The method of claim 1, wherein including the feedback request information in the MAC PDU comprises including the feedback request information in the last fragment of the management message when one or more fragments of the management message are transmitted using Hybrid Automatic Repeat Request (HARQ) with one management message fragment in transmission at a time and HARQ Acknowledgement (ACK) is received for all HARQ packets including the one or more fragments of the management message.

5. The method of claim 1, wherein the feedback request information is included in a header of the MAC PDU.

6. The method of claim 5, wherein the header includes fragmentation information of the management message.

7. The method of claim 1, further comprising including additional information along with the feedback request information in the MAC PDU, wherein the additional information includes information associated with a time interval within which the feedback is received after transmitting the feedback request information.

8. The method of claim 1, further comprising:
    starting a response timer after transmitting the MAC PDU including the feedback request information; and
    waiting for a fixed interval of time to receive the feedback after transmitting the MAC PDU including the feedback request information.

9. The method of claim 8, further comprising stopping waiting for the fixed interval of time to receive the feedback when a local Negative Acknowledgement (NACK) is received for the MAC PDU including the feedback request information, wherein a Hybrid Automatic Repeat Request (HARQ) and the NACK are enabled for management message transmission.

10. The method of claim 9, further comprising:
retransmitting the MAC PDU including the feedback request information; and
restarting waiting for the fixed interval of time to receive the feedback after the MAC PDU including the feedback request information is retransmitted.

11. The method of claim 8, further comprising determining that transmission of the management message is successful when the feedback is received before the response timer is expired, wherein the management message is a message that requires a response to the feedback request and requires using the response timer set to a greater time than a threshold, wherein the response timer is expired when a waiting time to receive the feedback is greater than the fixed interval of time.

12. The method of claim 8, further comprising determining that transmission of the management message is successful when a response message is received before the response timer is expired, wherein the management message is a message that requires a response to the feedback request and requires using the response timer set to a greater time than a threshold, wherein the response timer is expired when a waiting time to receive the feedback is greater than the fixed interval of time.

13. The method of claim 8 further comprising determining that transmission of the management message is failed when the feedback message is not received before the response timer is expired, wherein the management message is a message that requires a response to the feedback request and requires using the response timer set to a greater time than a threshold, wherein the response timer is expired when a waiting time to receive the feedback is greater than the fixed interval of time.

14. The method of claim 8, further comprising determining that transmission of the management message is failed when a feedback message or a response message is not received before the timer is expired, wherein the management message is a message that requires a response to the feedback request and requires using the response timer set to a greater time than a threshold, wherein the timer is expired when a waiting time to receive the feedback is greater than the fixed interval of time.

15. The method of claim 8, further comprising determining that transmission of the management message is successful when the feedback is received before the response timer is expired, wherein the management message is a unidirectional message and requires a reliable transmission, wherein the response timer is expired when a waiting time to receive the feedback for the fixed interval is greater than the fixed interval of time.

16. The method of claim 8, further comprising determining that transmission of the management message is failed when the feedback is not received before the response timer is expired, wherein the management message is a unidirectional message and requires a reliable transmission, wherein the response timer is expired when a waiting time to receive the feedback for the fixed interval is greater than the fixed interval of time.

17. A method for receiving a management message by a receiving device in a communication network, the method comprising:
receiving at least one Medium Access Control (MAC) Protocol Data Unit (PDU) including one or more fragments of the management message;
determining whether a feedback request information is included in a MAC PDU including a last fragment of the management message; and
if the feedback request information is included, transmitting a feedback for the management message to a transmitting device.

18. The method of claim 17, wherein the feedback request information is included in a header of the MAC PDU including the last fragment of the management message, wherein the header includes fragmentation information of the management message.

19. The method of claim 17, wherein the transmitting the feedback for the management message comprises transmitting the feedback within a predefined time after receiving all fragments of the management message.

20. The method of claim 17, wherein the management message is a request message that requires a response.

21. The method of claim 17, wherein the feedback includes a sequence number about the last fragment of the management message.

22. A transmitting device in a communication network comprising:
a processor configured to:
determine whether a feedback is required for the management message which is divided into one or more fragments, wherein the feedback is required when the management message is transmitted in the communication network;
if the feedback is required, include a feedback request information in a Medium Access Control (MAC) Protocol Data Unit (PDU) including a last fragment of the management message, wherein the one or more fragments of the management message is transmitted in at least one MAC PDU and wherein the management message is divided into one or more fragments; and
a transceiver configured to transmit the MAC PDU including the feedback request information.

23. The transmitting device of claim 22, wherein the processor determines whether the feedback is required based on a type of the management message, wherein the type of the management message comprising at least one of:
a first type that requires a response to the feedback request and requires using of a response timer set to a greater time than a threshold; and
a second type of the management message that is a unidirectional message and requires a reliable transmission.

24. The transmitting device of claim 22, wherein the processor identifies whether the management message requires a response to a feedback request and wherein a response time associated with the management message is greater than a threshold.

25. The transmitting device of claim 22, wherein the processor includes the feedback request information in the last fragment of the management message when one or more fragments of the management message are transmitted using Hybrid Automatic Repeat Request (HARQ) with one management message fragment in transmission at a time and HARQ Acknowledgement (ACK) is received for all HARQ packets including the one or more fragments of the management message.

26. The transmitting device of claim 22, wherein the feedback request information is included in a header of the MAC PDU.

27. The transmitting device of claim 26, wherein the header includes fragmentation information of the management message.

28. The transmitting device of claim 22, wherein the processor includes additional information along with the feedback request information in the MAC PDU, wherein the additional information includes information associated with time interval within which the feedback is received after transmitting the feedback request information.

29. The transmitting device of claim 22, wherein the processor starts a response timer after transmitting the MAC PDU including the feedback request information, and waits for a fixed interval of time to receive the feedback after transmitting the MAC PDU including the feedback request information.

30. The transmitting device of claim 29, wherein the processor stops waiting for the fixed interval of time to receive the feedback when a local Negative Acknowledgement (NACK) is received for the MAC PDU including the feedback request information, wherein a Hybrid Automatic Repeat Request (HARQ) and the NACK are enabled for management message transmission.

31. The transmitting device of claim 30, wherein the processor controls to the transceiver for retransmitting the MAC PDU including the feedback request information, and restarts waiting for the fixed interval of time to receive the feedback after the MAC PDU including the feedback request information is retransmitted.

32. The transmitting device of claim 29, wherein the processor determines that transmission of the management message is successful when the feedback is received before the response timer is expired, wherein the management message is a message that requires a response to the feedback request and requires using the response timer set to a greater time than a threshold, wherein the response timer is expired when a waiting time to receive the feedback is greater than the fixed interval of time.

33. The transmitting device of claim 29, wherein the processor determines that transmission of the management message is successful when a response message is received before the response timer is expired, wherein the management message is a message that requires a response to the feedback request and requires using the response timer set to a greater time than a threshold, wherein the response timer is expired when a waiting time to receive the feedback is greater than the fixed interval of time.

34. The transmitting device of claim 29, wherein the processor determines that transmission of the management message is failed when the feedback message is not received before the response timer is expired, wherein the management message is a message that requires a response to the feedback request and requires using the response timer set to a greater time than a threshold, wherein the response timer is expired when a waiting time to receive the feedback is greater than the fixed interval of time.

35. The transmitting device of claim 29, wherein the processor determines that transmission of the management message is failed when a feedback message or a response message is not received before the response timer is expired, wherein the management message is a message that requires a response to the feedback request and requires using a response timer set to a greater time than a threshold, wherein the timer is expired when a waiting time to receive the feedback is greater than the fixed interval of time.

36. The transmitting device of claim 29, wherein the processor determines that transmission of the management message is successful when the feedback is received before the response timer is expired, wherein the management message is a unidirectional message and requires a reliable transmission, wherein the response timer is expired when a waiting time to receive the feedback for the fixed interval is greater than the fixed interval of time.

37. The transmitting device of claim 29, wherein the processor determines that transmission of the management message is failed when the feedback is not received before the response timer is expired, wherein the management message is a unidirectional message and requires a reliable transmission, wherein the response timer is expired when a waiting time to receive the feedback for the fixed interval is greater than the fixed interval of time.

38. A receiving device in a communication network, comprising:
- a transceiver configured to receive at least one Medium Access Control (MAC) Protocol Data Unit (PDU) including one or more fragments of the management message; and
- a processor configured to:
- determine whether a feedback request information is included in an MAC PDU including a last fragment of the management message; and
- if the feedback request information is included, control to the transceiver for transmitting a feedback for the management message to a transmitting device.

39. The receiving device of claim 38, wherein the feedback request information is included in a header of the MAC PDU including the last fragment of the management message, wherein the header includes fragmentation information of the management message.

40. The receiving device of claim 38, wherein the transceiver transmits the feedback within a predefined time after receiving all fragments of the management message.

41. The receiving device of claim 38, wherein the management message is a request message that requires a response.

42. The receiving device of claim 38, wherein the feedback includes a sequence number about the last fragment of the management message.

* * * * *